United States Patent
Ferguson

(10) Patent No.: US 8,917,932 B2
(45) Date of Patent: Dec. 23, 2014

(54) METHOD OF PREDICTING PERCEPTUAL DIFFERENCES BETWEEN MEMORY AND DIRECTLY VIEWED COLORS IN VIDEO

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 13/340,506

(22) Filed: Dec. 29, 2011

(65) Prior Publication Data

US 2013/0170740 A1 Jul. 4, 2013

(51) Int. Cl.
| | |
|---|---|
| G06K 9/00 | (2006.01) |
| G06T 7/00 | (2006.01) |
| H04N 17/00 | (2006.01) |
| H04N 17/02 | (2006.01) |

(52) U.S. Cl.
CPC *G06T 7/00* (2013.01); *H04N 17/00* (2013.01); *H04N 17/02* (2013.01)
USPC .......................................... 382/167; 348/180

(58) Field of Classification Search
USPC .................................................. 382/162, 167
See application file for complete search history.

(56) References Cited

U.S. PATENT DOCUMENTS

| | | | | |
|---|---|---|---|---|
| 5,905,812 | A * | 5/1999 | Kim ............................... | 382/236 |
| 6,760,474 | B1 * | 7/2004 | Fenne ............................ | 382/162 |
| 6,907,143 | B2 | 6/2005 | Ferguson | |
| 6,975,776 | B2 | 12/2005 | Ferguson | |
| 6,976,045 | B2 | 12/2005 | Ferguson | |
| 8,189,911 | B2 * | 5/2012 | Ninassi et al. ................ | 382/167 |
| 8,229,229 | B2 | 7/2012 | Ferguson | |
| 8,355,567 | B2 | 1/2013 | Ferguson | |
| 2003/0152284 | A1 * | 8/2003 | Ferguson ....................... | 382/274 |
| 2007/0065007 | A1 * | 3/2007 | Yamazoe et al. .............. | 382/167 |
| 2010/0149344 | A1 * | 6/2010 | Ferguson ....................... | 348/180 |
| 2012/0265532 | A1 | 10/2012 | Ferguson | |

OTHER PUBLICATIONS

Main, James et al.: "The Stability of Human Colour Memory and Distribution of Recalled Colours," Mar. 30, 2006, XP055095107, retrieved from the Internet on Jan. 7, 2014, URL: http://www.inference.phy.cam.ac.uk/is/papers/JEMainColourProject.pdf; pp. 2-11.

Winkler, S.: "A Perceptual Distortion Metric for Digital Color Video," Proceedings of SPIE—International Society for Optical Engineering, US, vol. 3644, Jan. 1, 1999, pp. 175-184, XP002306157.

European Search Report and Written Opinion for Application No. 12198739.0, dated Jan. 17, 2014, 6 pages.

"The CIECAM02 Color Appearance Model," CIE Technical Committee 8-01, 2002, 5 pages.

(Continued)

*Primary Examiner* — Hadi Akhavannik
(74) *Attorney, Agent, or Firm* — Marger Johnson & McCollom PC

(57) ABSTRACT

Disclosed is a processor for predicting perceptual differences between colors recalled from memory and directly viewed colors in a tested video. The processor includes a memory effects processor structured to generate compensation factors for distortions of color due to memory effects and apply the compensation factors to data from the reference video or data from the tested video. The compensation factors may include factors for changes in saturation over time, changes in hue angle, changes in uncertainty, and a categorization factor that reflects a trend in shifts and towards cardinal color centroids over time in memory.

13 Claims, 9 Drawing Sheets

(56) References Cited

OTHER PUBLICATIONS

Gunter Wyszecki, W. S. Stiles, "Color Science: Concepts and Methods, Quantitative Data and Formulas, 2nd Edition," 1982, John Wiley & Sons, NY, pp. 306-330.

R. M. Boynton, R. E. MacLaury and K. Uchikawa, "Centroids of color categories compared by two methods." Color Research and Application, 14(1), 6-15, 1989.

Kenneth L. Kelly and Deane B. Judd, "The ISCC-NBS Method of Designating Colors and a Dictionary of Color Names," National Bureau of Standards Circular 553, 1965.

Mark A Lewis, et al., "Mathematical Biology," American Mathematical Society Institute for Advanced Study, 2009, Lecture 5, esp. p. 380-390.

S. M. Newhall, R. W. Burnham, Joyce R. Clark, "Comparison of Successive with Simultaneous Color Matching," JOSA, Jan. 1957, vol. 47, No. 1, pp. 43-56.

K. Uchikawa, "Purity discrimination: successive vs. simultaneous comparison method." Vision Research, 23(1), pp. 53-58, 1983.

Jin, Elaine W; Shevell, Steven K, "Color memory and color constancy," JOSA A, vol. 13 Issue 10, pp. 1981-1991 (1996).

Sachtler, W L; Zaidi, Qasim, "Chromatic and luminance signals in visual memory," JOSA A, vol. 9 Issue 6, pp. 877-894 (1992).

Ling, Yazhu; Hurlbert, Anya, "Role of color memory in successive color constancy," JOSA A, vol. 25 Issue 6, pp. 1215-1226 (2008).

ITU-R Rec BT.500-11 "Methodology for the subjective assessment of the quality of television pictures."

Paula J. Alessi et al, "A Colour Appearance Model for Colour Management Systems: CIECAM02", CIE 159:2004.

Tektronix PQA200/300 Product, "Series J: Cable Networks and Transmission of Television, Sound Programme and Other Multimedia Signals, Measurement of the quality of service, Objective perceptual video quality measurement techniques for digital cable television in the presence of a full reference," ITU-T Recommendation J.144, Mar. 2001, 82 pages.

Tektronix PQA600 Product Description, Internet snapshot dated Dec. 26, 2011, URL: http://web.archive.org/web/20111226161307/ http://www.tek.com/picture-quality-analyzer, 2 pages.

Stephen K. Reed, "Cognition," Brooks/Cole Publishing Company, 1992, Chapter 8.

\* cited by examiner limit A = 10

$$x_n = \left| n \cdot \frac{\text{limitA}}{N} \right|$$    memDelaySec = 30 memA1n = memAngle($x_n$,0,limitA,memDelaySec) − GlobalShiftDeg(memDelaySec)

Cal_power = 4    Cal_limAngleSens = 0.6 limit A = 10

$$x_n = \left| n \cdot \frac{\text{limitA}}{N} \right|$$    memDelaySec = 30 memA1n = memAngle($x_n$,0,limitA,memDelaySec) − GlobalShiftDeg(memDelaySec)

Cal_power = 20    Cal_limAngleSens = 1.5

METHOD OF PREDICTING PERCEPTUAL DIFFERENCES BETWEEN MEMORY AND DIRECTLY VIEWED COLORS IN VIDEO

FIELD OF THE INVENTION

This disclosure is directed toward to picture quality analysis, and, more particularly, to a system that provides an assessment of relative quality between a directly viewed picture or video and a picture or video recalled from memory.

BACKGROUND

Videos are often changed from an original video stream to a modified one. The impetus to change is often related to the bandwidth of the target medium over which the modified video stream will be transmitted, but there are a variety of reasons to modify videos. Other reasons for processing video include editing, compression and decompression, reformatting, video insertion and overlay, minimization of transmission errors, and modifying color for different displays, for example.

Some systems for comparing two videos to one another include two inputs, one of a video being tested and one as a reference video. One such system is the PQA product line such as the PQA 500/600, or PQASW available from Tektronix of Beaverton, Oreg. The two videos are directly compared and various measurements are generated describing the original, modified, or the comparison between them. Other systems for comparing two videos include showing an original video first, then quickly showing the modified video, or vice-versa. Not only is such a system time consuming, such comparisons are not as accurate as those simultaneously made due to unaccounted human color memory distortions and fading of color memory inherent in human viewers. Successive viewing is the dominant, and may be only, feasible way to compare video as completely as possible for the most repeatable and reliable video quality assessment by humans.

The effects of color bias when evaluating images recalled from memory occur in several scenarios. For example, video data compression and decompression (codec) technology is inherently lossy, with errors introduced. The best technology introduces error with minimum perceptual impact. However, even a very good codec technology that produces good looking video can produce ugly artifacts if certain video content is used and/or the bit rate selected is set too low. Color artifacts are among the artifacts that can be created. The industry standard best method of evaluating subjective quality is ITU-R BT.500, which describes many methods of using people to view and rate the video, and then getting statistics to indicate the best among those evaluated. Generally short video clips of 8 to 12 seconds are used and rated successively. The shortest time between clips is generally about a couple of seconds, so that the shortest time between corresponding frames is about 10 seconds, while the longest time between corresponding frames could be minutes. Though ITU-R BT.500 is followed by many engineering organizations, in many cases it is too expensive and/or time consuming. In these cases, individual evaluators may simply look at one clip, then the other. In all of these cases, memory of color is used in the evaluation, with delay between corresponding frames ranging from a few seconds to many seconds to minutes to indefinite (i.e. no reference used, simply using memory of how similar objects look from previous experience).

Another scenario regarding color analysis from recalled colors involves video conversion between resolutions and frame rates. For example, many converters have been sold specifically for evaluating and/or optimizing conversion from HD to SD and from SD to HD. The digital representation of color is different in HD than historic SD, though the US standard for digital television transmission (ATIS) allows for both old and new methods (SMPTE-M vs. 709 colorimetry) for SD resolution. In various audits of broadcast signals, it was common to find incorrect colorimetry being broadcast due to conversion, or simply due to not setting the proper flags for colorimetry in the corresponding data field. While the resulting color error is often subtle, it can be quite obvious in some cases. Again, the evaluation methods are as in the codec evaluation case, though in practice successive viewing, once each, is often used, especially if it is cumbersome to switch between video standards being displayed.

In a scenario involving editing, when putting together film or video clips from a particular outdoor scene that was shot over a time period spanning several hours, the lighting changes due to change in position of the sun, clouds, etc. For the scene to look coherent, color editing is generally required. In some cases, due to time constraints or due to controls available within given color editing tools, it is not practical or feasible to completely color correct one clip to match another. However, if these two clips are shown with a 3rd clip in between, the resulting delay between the first 2 clips reduces most people's ability to notice a color difference. Being able to predict how many seconds are required (which depends on the type of clip) in between the two clips for matching perceived (memory and direct) colors would save valuable time. Otherwise, educated guesses along with trial and error are used.

Unfortunately, because of the human color memory distortions and fading inherent in human viewers, accurate prediction of color differences is difficult or impossible between a present video being compared to one recalled from memory, even if the recall period is relatively short.

Embodiments of the invention address this and other limitations of the prior art.

SUMMARY OF THE INVENTION

A perceptual difference component of a color appearance model is modified to account for color distortions of human memory. Embodiments of the invention significantly improve the accuracy of prediction of human color differences recalled from memory by accurately predicting and incorporating the distortions and uncertainty due to the fading of memory that occur in humans Particular embodiments of the invention are directed to processor for predicting perceptual differences between colors recalled from memory and directly viewed colors in a tested video. The processor includes a memory effects processor structured to generate a compensation factor for distortions of color due to memory effects and apply the compensation factor to data from the reference video or data from the tested video.

DETAILED DESCRIPTION

When viewed colors are compared to those recalled from memory, judgments of color differences are different from judgments of differences when colors are viewed side by side or in immediate succession. Depending on the individual and application/task, altered sensitivity to color differences when compared to memory is due to any combination of the following:

a) degree of attention to color (of specific objects and/or generally);

b) fading memory of what was seen resulting in increased uncertainty with time, unless intentionally committed to memory;

c) if committed to memory, quantization error due to categorization typically takes place, with a mean error magnitude inversely proportional to the number of categories known, in turn depending on the level of training;

d) perceptual color memory tends to be exaggerated with, for example, increased saturation; and e) other biases of color memory.

Figure 1:
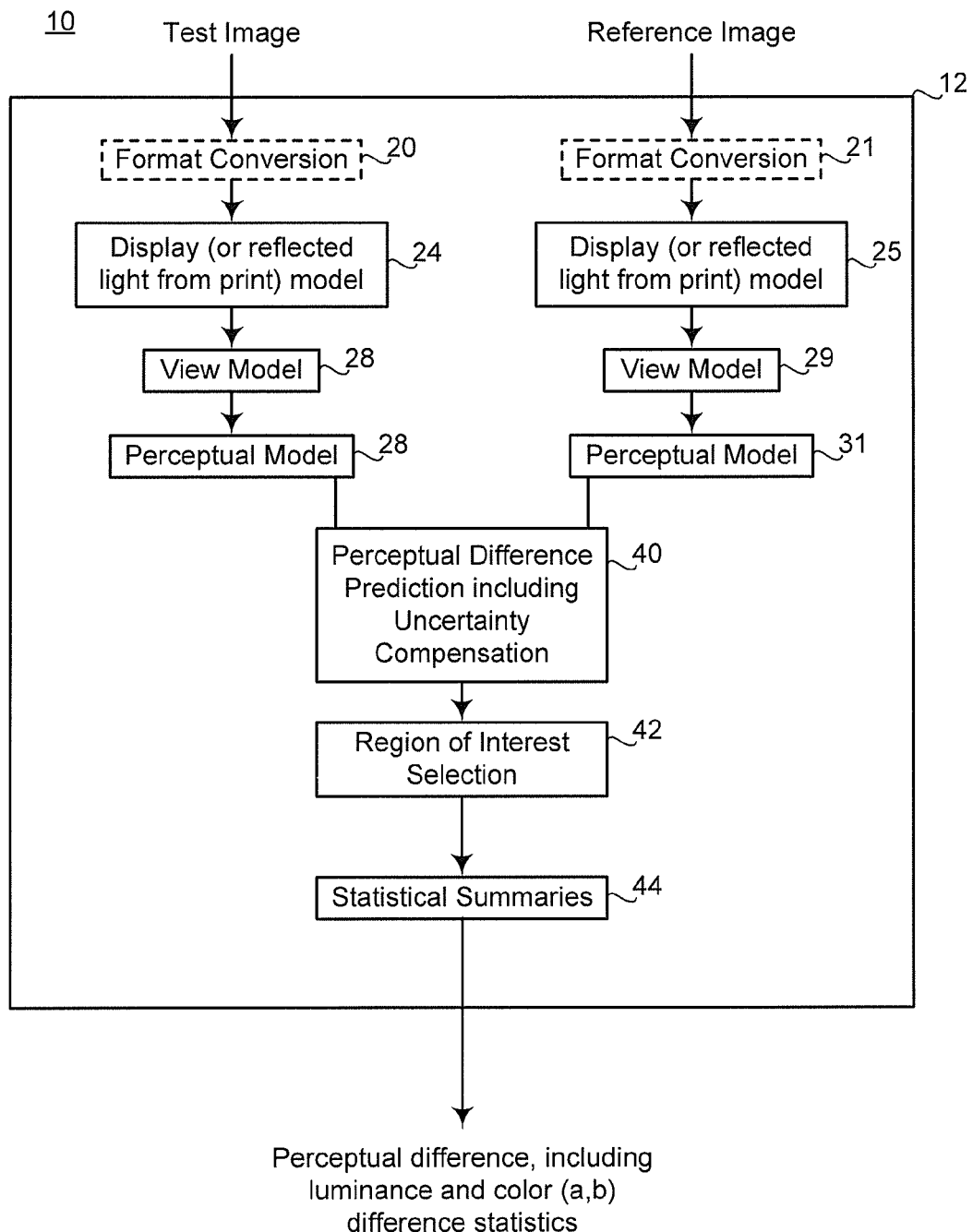
FIG. 1 is a functional block diagram of a system for predicting ratings using a moving image color appearance model according to embodiments of the invention.

FIG. 1 is a functional block diagram of a system for predicting ratings using a moving image color appearance model that includes color compensation that may be invoked when evaluating images recalled from memory.

Portions of FIG. 1 appear in US patent application publication 2010/0149344, published on Jun. 17, 2010, entitled METHOD AND APPARATUS FOR IMPLEMENTING MOVING IMAGE COLOR APPEARANCE MODEL FOR VIDEO QUALITY RATINGS PREDICTION, which provides background and operational details of the model. The model is referred to herein as MICAM.

With reference to FIG. 1, in a MICAM 12, a test image and a reference image, which may also be respective series of images, are received as separate inputs into separate optional format converters 20, 21. The format converter 20, 21 convert the inputs for the display models 24, 25, which in turn convert respective inputs to simulated light for input to the respective view and perceptual models 28, 29, 30, and 31. The respective perceptual models 30, 31 output respective color response per spatial (e.g. pixel) and temporal (e.g. frame) samples in units of CIECAM02 {a,b}. CIECAM02 is the widely known *Color Appearance Modeling for Color Management Systems*, Published in 2002 by the CIE Technical Committee 8-01. These respective {a,b} video responses are used to estimate perceived differences between the reference image(s) and the modified (test) image(s).

In addition to the perceptual models 30, 31, cognitive models, could be added to the system. The region of interest within the images may be selected in a selector 42, which may be a region in either space or time or both. In some embodiments a default region of interest is the entire frame(s) for the entire length of the test and reference image(s). The output of the MICAM 12 is a set of statistical summaries of comparisons between the test and reference images as illustrated in FIG. 1. While the international standards bodies recommend color modeling for static image color patches, CIECAM02, is used as the basis for building a color vision model sufficiently accurate for video. CIECAM02 was designed, calibrated and verified to determine the threshold, direction and magnitude of color differences.

Published studies have been used to determine cardinal hues for describing changes in hue, as well as extreme hue angles for each cardinal hue. These studies used subjects from different cultures and corresponding native speakers of different languages, and identified large portions of the color space where fundamentally basic color categories reside. One such reference, entitled "Centroids of color categories compared by two methods," by R. M Boynton, R. E. MacLaury and K. Uchikawa, includes plots in OSA gjL color space of pink, red, brown, orange, yellow, green, blue and purple. Because brown largely coincides with red and orange in hue angle, distinguished mainly by brightness/luminance represented by the L axis, it is not used. This leaves pink, red, brown, orange, yellow, green, blue and purple as the cardinal colors. Colors between consecutive cardinal colors may be systematically named using hyphen or slash between the corresponding names. For example, a color that lies between the region of green and yellow is called "green-yellow" or "green/yellow."

The bounds of cardinal colors of the Boynton reference were identified by exhaustively sampling colors across the OSA color space and categorizing each in the cardinal color categories (or none). The set of colors for each cardinal color category were converted form OSA gjL into xyY, using a proprietary method, and then further converted to CIECAM02 ab space and corresponding hue angles h(a,b) using the method outlined in the CIECAM02 document.

Figure 2:
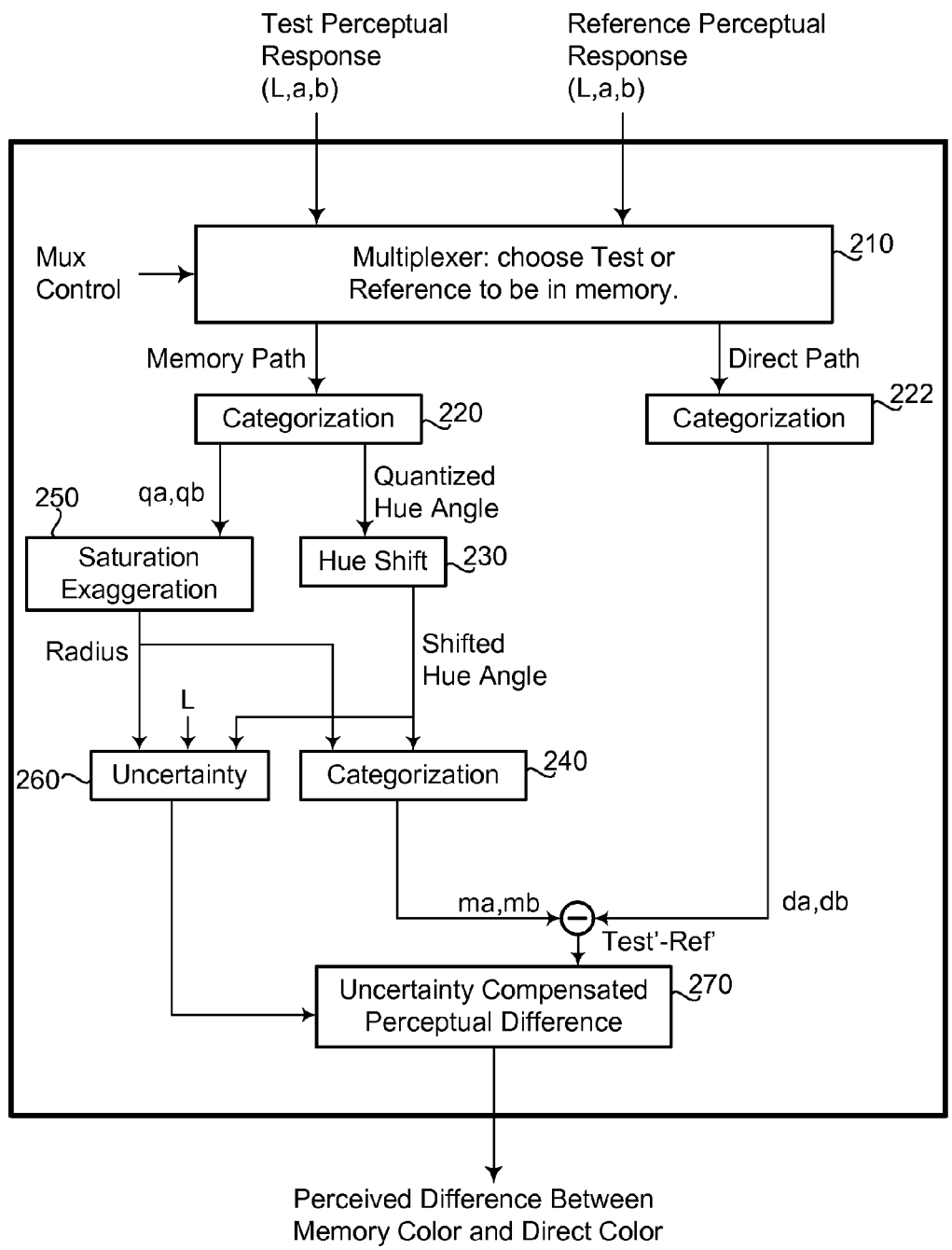
FIG. 2 is a functional block diagram of a prediction block for chrominance specific processing of the perceptual difference that includes uncertainty compensation according to embodiments of the invention.

FIG. 2 is a functional block diagram of a prediction block for chrominance specific processing of the perceptual difference that includes uncertainty compensation according to embodiments of the invention. The prediction block includes specific processes to account for categorization, saturation exaggeration, and hue shift, as described in detail below.

Categorization

There are a relatively small number of "cardinal color categories" used by people that are otherwise untrained, from diverse cultures and entirely with different native languages. Trained individuals can categorize more than dozens of colors, and some individuals are documented to be able to categorize hundreds or thousands. Some believe theoretical upper limits could be in the millions. While it is known that categorization is a cognitive scheme used to improve memory retention, in essence a lossy compression scheme, this phenomenon has not been exploited directly in any video quality assessment method to date. Further, there is a more subtle effect of perceived color memory shifting toward these cardinal colors, even when no intentional effort to memorize color category has been made.

The number of color categories and the centroids of the corresponding cardinal colors differ from individual to individual and among groups of viewers according to several factors. Each case may be predicted given the likely degree of training, the particular application, etc. An example range of viewer types and corresponding color categories include:

a) A default "typical viewer": category cardinal color centroids in CIECAM02 a,b space;

b) For those more expert in color analysis, more refined categories appropriate for the application can be included;

c) For those refined memory perception, the viewer is either:

i) ultimate expert with low cognitive loading, meaning video changes slowly with only a few colors; or ii) interested, attentive individual with sufficient time to repeatedly compare each portion of video;

or both i) and ii), in which case the categorization process becomes virtually transparent, and subsequent memory distortion is reduced accordingly.

The input to the categorization block 220 may be either CIECAM02 a,b, Cartesian/rectangular coordinates that have been converted to hue angle and optionally radius, of polar coordinates, or the input may be corresponding hue angle and radius (polar coordinates), used directly.

Quantization is a mathematical process that allows fairly accurate modeling of categorization.

Quantization, for example of the hue angle, in CIECAM02 a,b space occurs in embodiments of the invention according to:

memAngle(sampleAngle,centriodAngle,limitAngle, memDelaySec)=centroidAngle+
  newLocation(sampleAngle−centroidAngle,
    |sampleAngle centroidAngle|
    *Cal_LimAngleSens*memDelayFactor(delay))+globalShift(delay)
  where
  newLocation(sampleAngle, knee)=sampleAngle*f(sampleAngle,knee)
    f(sampleAngle,knee)=sampleAngle^Cal_power/
    (sampleAngle^Cal_power+(0.5*(knee+Cal_kneeOS))
      ^Cal_power) memDelayFactor(delay)=1−e^(−delay/Cal_UncertaintyTimeConstantSec)
  globalShift(delay)=
Cal_maxGlobalShiftDeg*memDelayFactor(delay)^2

The level of quantization is controlled by Cal_kneeOS, Cal_LimAngleSens & Cal_power, as described below.

globalShift(delay) is due to "Other shifts in color" and is discussed with reference to Hue Shift in the Memory Distortions In Hue and Saturation section below.

Figure 3A:
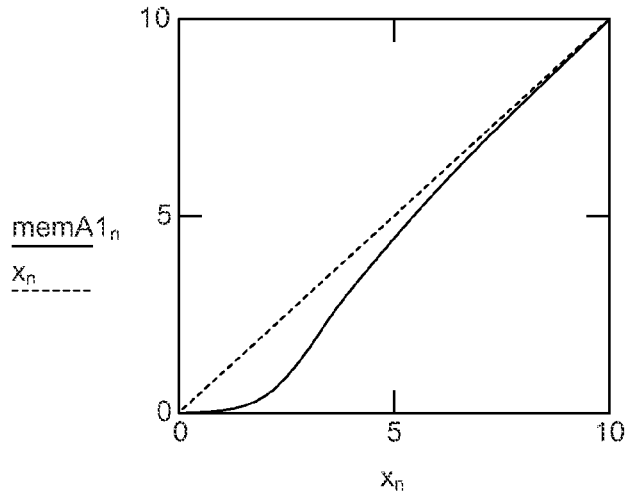
FIGS. 3A, 3B, and 3C are example plots of various warping factors used in a categorization process within the color appearance model system of FIG. 1, according to embodiments of the invention.
Figure 3B:
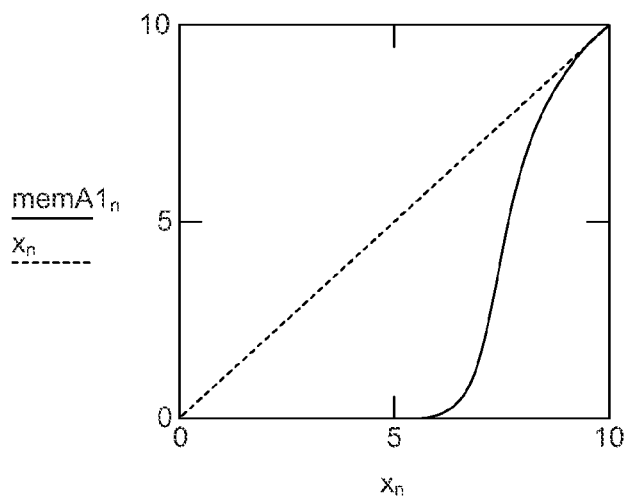

The f(sampleAngle,knee) process determines the softness or hardness of the quantization, as described with reference to FIGS. 3A and 3B.

The centroid angles are the cardinal colors described above. Additional colors in addition to the cardinal colors may be added to reflect the training and vocabulary of a particular viewer and/or a particular industry group, such as those trained for specific applications, by converting Munsell or other color coordinates to a,b coordinates and setting borders with closest neighbors. Border setting may be performed using subjective data, or, in lieu of subjective data, approximated as half the (a,b) distance between centroids.

Depending on the application, the human observer (viewer) being predicted may be well trained in many color categories, or just the principal, cardinal ones. The hardness or softness of the quantization is also a function of how well the observer can remember distinct subcategories or modifications of the basic category, cognitive loading, and other factors. Once the observer type has been determined, the corresponding hard or soft limiting type quantization may be used for color memory prediction as described with reference to FIGS. 3A and 3B.

Figure 3C:
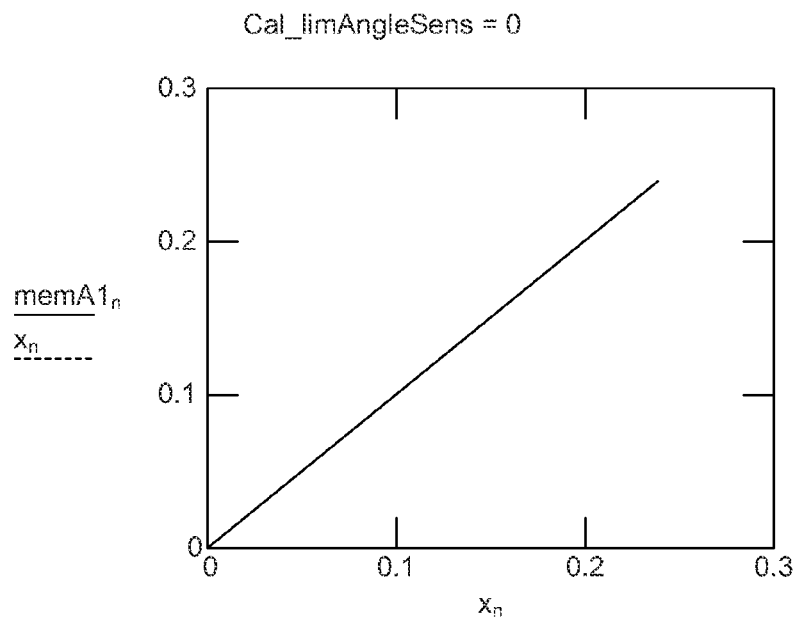

In effect, the cardinal color is an attractor warping color space such that nearby colors are pulled closer. The effective warping can range from none, in the case of a direct viewing comparison or a world expert in refined color categorization, to severe, which results in a near hard limiting at the category boundary threshold. For relatively soft limiting, where the hue angle does not change very much from the directly viewed perceived angle, the default value for limit angle sensitivity (Cal_limAngleSens=0.6, CalKneeOS=0.007) can be used along with powers between 2 and 4 (Cal_power). An example of such relatively soft limiting is illustrated in FIG. 3A, in which the curved line is the calculated soft warping using the listed factors, compared to the dotted line of no warping. In FIGS. 3A, 3B, and 3C, the x-axis represents the instantaneous angle, while the y-axis represents the angle recalled from memory.

Harder warping may be achieved by using higher values for limit angle sensitivity (i.e. Cal_limAngleSens=1.5), along with large powers between, i.e. 10 and 30 (i.e. Cal_power=20). Such an example is illustrated in FIG. 3B, in which, in this example, there is no distinction between the cardinal color angle and the memory color angle if the original hue angle difference is less than about 6 degrees. In effect, colors within 6 degrees of the cardinal color are pulled all the way to the cardinal color attractor. This represents a very color decisive individual without much training in color categories, or at least not much attention to detail for refinement of color category.

For no categorization quantization, no color space warping, no cardinal color attractor, in the case of direct viewing and or world expert in refined color categorization, Cal_limAngleSens is set to 0, which is illustrated in FIG. 3C

Though the predominant dimension of categorization is hue, saturation may also be categorized and thus quantized analogously in a block 240 of FIG. 2. For the nominal preferred embodiment, this saturation quantization step is not considered a requirement since saturation quantification tends to have more variance or uncertainty, and the uncertainty tends to dominate relative to quantization error. Uncertainty is predicted using a process described below. However, for some particular specialized applications, the a,b radius (associated with saturation) quantization mechanism may improve prediction results. For example, for the best prediction of color memory of the intermediately trained individual, the above quantization mechanism may be applied to the a,b radius using the same process, substituting angle inputs and calibration with analogous ones for the radius in a,b space.

Hue Shift

Color saturation is exaggerated when memory of colors are recalled. Short term adaptation effects accounting for perceptual sensitivity shifts with shifts in biases due to changes in average local and global luminance, color, etc. are incorporated in the human vision models described with reference to FIG. 1 above.

A global hue shift may be included within the categorization process described above and executed in the processes 220, 240, even though technically the hue shift is a phenomenon of perceived color memory/recall. It is convenient to include the hue processing within the categorization processing, however, because it allows angle processing to be grouped, which makes for more efficiencies when the processes are implemented in hardware, firmware, such as DSPs and FPGAs, etc., and in software.

A global hue shift may be effected by:
globalShift(delay)=Cal_maxGlobalShiftDeememDelayFactor(delay)^2
where
Cal_maxGlobalShiftDeg=5 degrees
memDelayFactor(delay)=wtdelay (delay)=1-e^(-delay/Cal_UncertaintyTimeConstantSec)
An equivalent MathCAD version would be:

$$wtdelay(d) := 1 - e^{\frac{-d}{Cal\_UncertaintyTimeConstantSec}}$$

Cal_UncertaintyTimeConstantSec:= 6.249

Saturation Exaggeration

Saturation is exaggerated in color memory and predicted as a function of color (a,b) and associated radius (where radius=length(a,b) defined below), the closest corresponding cardinal color centroid radius, described above, and delay since originally viewed, memDelaySec.

Saturation exaggeration may be effected by:
memRadius(sampRad,centRad,a,b,memDelaySec)=
length(aRad(sampRad,centRad,a,b,memDelaySec),bRad(sampRad,centRad,a,b,memDelaySec))
where
length(a,b)=sqrt(a^2+b^2)
aRad(sampRad,centRad,a,b,memDelaySec)=
a*(sampRad+centRad*aRadDeltaFactor(sampRad,centRad,a,b,memDelaySec))/(sampRad+centRad)
bRad(sampRad,centRad,a,b,memDelaySec)=
b*(sampRad+centRad*bRadDeltaFactor(sampRad,centRad,a,b,memDelaySec))/(sampRad+centRad)
aRadDeltaFactor(sampRad,centRad,a,b,memDelaySec)=
1+Cal_aRadiusDeltaGain*memDelayFactor(delay)^Cal_MemSatTimeLapsePower
bRadDeltaFactor(sampRad,centRad,a,b,memDelaySec)=
1+Cal_bRadiusDeltaGain*memDelayFactor(delay)^Cal_MemSatTimeLapsePower
Nominally, Cal_MemSatTimeLapsePower=1, so
aRad(sampRad,centRad,a,b,memDelaySec)=1
+Cal_aRadiusDeltaGain*memDelayFactor(delay))
bRad(sampRad,centRad,a,b,memDelaySec)=1
+Cal_bRadiusDeltaGain*memDelayFactor(delay))

With reference back to FIG. 2, in operation, the perceptual difference prediction with uncertainty compensation begins by both a test image (or group of images) and reference image (or group of images) being presented to the predictor 40. Input to a multiplexer 210 determines if it is the test image or reference image to be memory compensated.

Both the direct and memory paths go through a categorization process 220, 222, as described above, which uses the compensation factors described with reference to FIGS. 3A, 3B, and 3C. Then, the memory path is compensated for hue shift in a process 230, and for saturation exaggeration in a process 250, also as described above.

The output of the hue shift compensation process 230 is a shifted hue angle, and the output of the saturation exaggeration process 250 is a radius having a changed size. Both the shifted radius and shifted hue angles may again go through another categorization process 240.

The output of the categorization process 240 is compared to and subtracted from the output of the categorization process 222, from the direct path such that the respective test color vector is subtracted from the respective reference color vector. For example, if the reference (L,a,b) was chosen via the multiplexer to be the color in perceptual memory, the resulting "Test-Ref"=(cda,cdb) color difference of FIG. 2 will be:

Color difference=(cda,cdb)=(da,db)-(ma,mb)=(da-ma, db-mb)
Otherwise
Color difference=(cda,cdb)=(ma,mb)-(da,db)=(ma-da, mb-db)

A uncertainty process 260 depends on delay between the original viewing of the recalled image (video frame), the luminance level of the color, the location in CIECAM02 a,b space: distance (radius) from the color origin (approximately, the relative saturation), and the hue angle.

Delay may be calculated by:
memDelayFactor(delay)=1-e^(-delay/Cal_U ncertaintyTimeConstantSec) An equivalent version in MathCAD would be:

$$wtdelay(d) := 1 - e^{\frac{-d}{Cal\_UncertaintyTimeConstantSec}}$$

Cal_UncertaintyTimeConstantSec:= 6.249

Luminance may be calculated by:
LumWt(n its)=n its^2/(nits^2+Cal_U ncertaintyLumKneeN its^2)
An equivalent version in MathCAD would be:

$$LumWt(nits) := \frac{nits^2}{(nits^2 + Cal\_UncertaintyLumKneeNits^2)}$$

Radius may be calculated by:
RadiusWt(radius)=Cal_UncertaintyRadiusWtdMin+radius/(radius+Cal_UncertaintyRadiusWtdKnee)
An equivalent version in MathCad would be:

$$wtr(radius) := Cal\_UncertaintyRadiusWtMin + \frac{radius}{radius + Cal\_UncertaintyRadiusWtKnee}$$

Cal_UncertaintyRadiusWtKnee:= .04

Cal_UncertaintyRadiusWtMin:= .005

Hue Angle may be calculated by:

$$wta(angle) :=$$
$$Cal\_aUncertaintyAngleWtMin - Cal\_aUncertaintyAngleWtMod \cdot$$
$$\cos\left(\frac{\pi}{180} \cdot angle + Cal\_aUncertaintyAngleWtPhase\right)$$
$$wtb(angle) := Cal\_bUncertaintyAngleWtMin -$$
$$Cal\_bUncertaintyAngleWtMod \cdot$$
$$\sin\left(\frac{\pi}{180} \cdot angle + Cal\_bUncertaintyAngleWtMod\right)$$

Cal_aUncertaintyAngleWtMin:= 0.071

Cal_aUncertaintyAngleWtMod:= 0.028

-continued

Cal_aUncertaintyAngleWtPhase:= 30

Cal_bUncertaintyAngleWtMin:= 0.086

Cal_bUncertaintyAngleWtMod:= 0.034

Cal_bUncertaintyAngleWtPhase:= 10

Using the processes for predicting uncertainty based on delay, luminance and specific color (radius and angle in CIECAM02 space), a composite process to produce ua and ub (uncertainty of a and uncertainty of b) is given as:

Uncertainty_$a_{testInd}$:=wtdelay(delay$_{testInd}$)·wta (abAngle$_{testInd}$)·wtr(abRadius$_{testInd}$)·LumWt(Lum$_{testInd}$)

Uncertainty_$b_{testInd}$:=wtdelay(delay$_{testInd}$)·wtb (abAngle$_{testInd}$)·(wtr(anRadius$_{testInd}$))·LumWt(Lum$_{testInd}$)

where
the abRadius is simply the a,b vector length (square root of the sum of squares)
and
the abAngle (a,b hue angle) is calculated from the CIECAM02 a,b coordinates, using a four quadrant arctan function such that arctan(a/b) provides the angle form 0 to 180 degrees (or radian equivalents).

An uncertainty compensation process 270 is effectively a masking process using a noise masking model the same or similar to that described in U.S. Pat. No. 6,975,776, entitled "Predicting human vision perception and perceptual difference" in which:

noiseMaskedSignal(signal, noise):= $\sqrt{signal^2+noise^2}$−noise

Where the noise value is derived from the uncertainty as follows:

$$noiseFromUncertainty(uncertainty, JND) := \frac{uncertainty^2 - JND^2}{2 \cdot JND}$$

Where JND (Just Noticible Difference) is approximately 0.025.

This masking is applied separately to both the a (cda) and b (cdb) components of the color difference.

The interpretation of this uncertainty masking relates to thresholds. With direct viewing and comparison of colors, there is a threshold for just noticeable difference, below which colors look the same. The uncertainty function for memory results in an increase in this threshold such that the resulting perceptual difference corresponds to a JND, about 0.025 in CIECAM02 a,b space. So, for example, as memory fades over time and uncertainty increases, the threshold difference between memory matched color (shifted due to categorization, saturation exaggeration and global angle shift) and directed viewed color increases.

Example of masking of signal (cda or cdb) due to uncertainty:

JND:=0.025

Uncertainty:=0.08

Consider case where difference component cda matches the threshold increase due to uncertianty cda:=Uncertainty NoiseExample:=noiseFromUncertainty(cda, JND) NoiseExample=0.116 noiseMaskedSignal(cds, NoiseExample)=0.025

Memory distortions and uncertainty may be modified due to an increased number of color categories. The memory distortions in hue angle and saturation (a,b radius) and uncertainty are all reduced proportionally to the local color category density. The 2-D IIR spatial filter (based on a cascade of horizontal and vertical bidirectional IIR filters of the above-referenced '776 patent) may be applied to impulses in a,b space corresponding to cardinal color centroids in order to determine, both for the nominal case of centroids in the cardinal colors described above and any new specific case with added cardinal category colors. The relative increase filter response at any point in a,b space determines the reduction in hue angle shift, saturation exaggeration and uncertainty using the following approximation:

relativeChangeReductionFactor(newDensity(a, b),nominalDensity(a, b))=2*nominalDensity(a, b)/(nominalDensity (a, b)+newDensity(a, b))

where
newDensity(a,b)=2DIIRLPF(Impulse(NewCardinalColorCentroid(n)) nominalDensity(a, b)=2DIIRLPF(Impulse (NominalCardinalColorCentroid(n))

Thus for cases where colors within the focus of attention may be memorized, up to the limit of cognitive loading, or in cases such as predicting ensemble response as in DMOS, or other similar subjective scores based on multiple viewings by multiple people, and where many color categories are known by at least some significant portion of the viewers, the average new equivalent cardinal color centroid density may be determined, and applied to the regions of focus of attention. For highest color category densities where all colors are successfully memorized (not the usual case), there is effectively no change due to memory.

Figure 4:
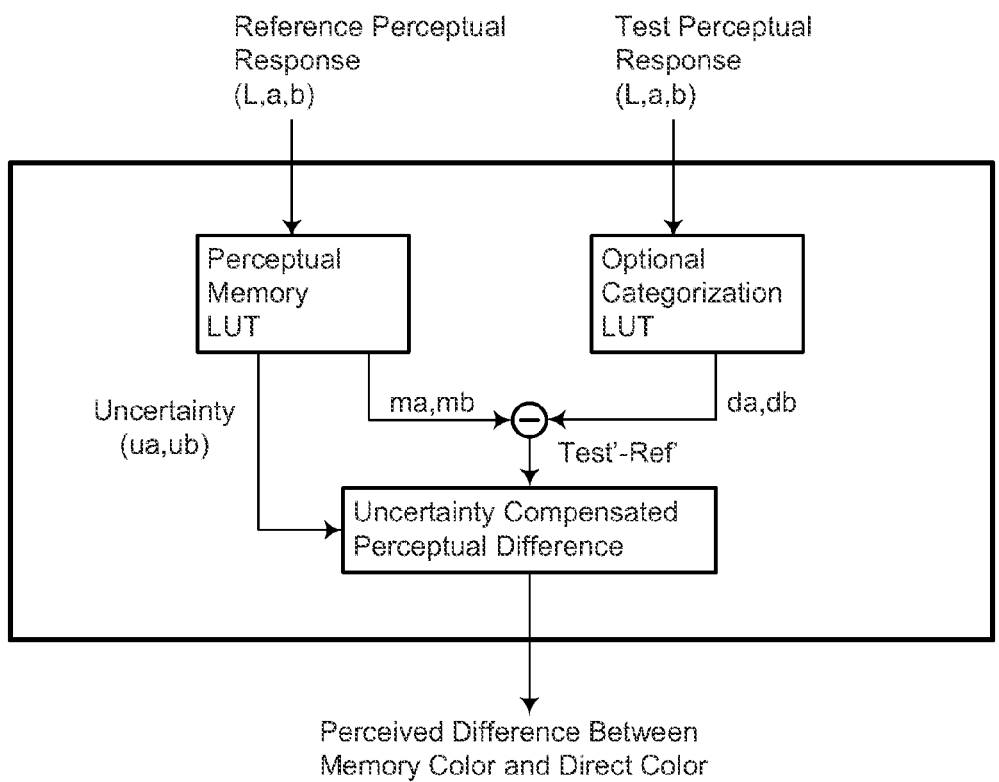
FIG. 4 is a functional block diagram of a simplified prediction block for chrominance specific processing of the perceptual difference according to another embodiment of the invention.

FIG. 4 is an alternative embodiment for the perceptual difference block described in FIG. 2, having improved speed at the expense of some accuracy. Instead of processing all of the intermediate outputs up through the uncertainty compensator 260 and categorization blocks 232, 240, Look Up Tables (LUTs) may be initialized using the corresponding processing of FIG. 2 with the full (L,a,b) range of interest and resolution required (or feasible for accommodating the LUT space from available memory).

Note that the multiplexer of FIG. 2 may be moved to the respective LUT initialization. Instead of multiplexing the input L,a,b of reference and test channels, the respective LUT's may be initialized to convert L,a,b to direct, with or without optional categorization, or memory a,b.

Figure 5:
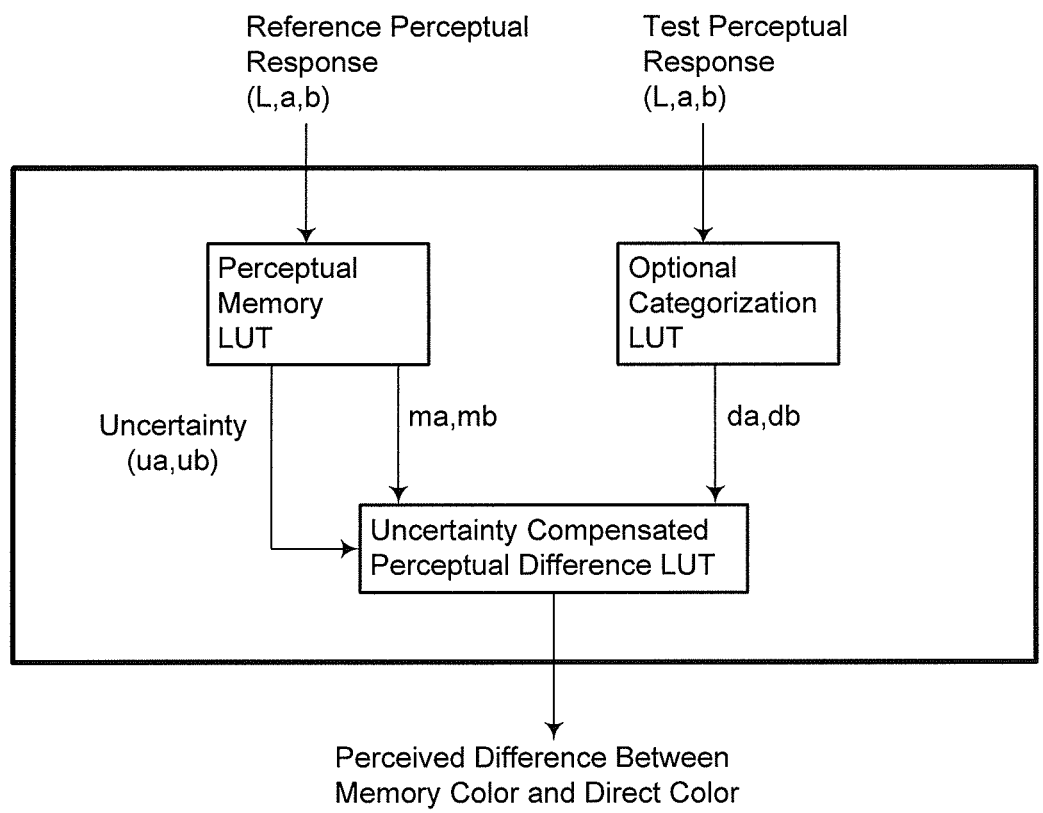
FIG. 5 is a functional block diagram of another simplified prediction block for chrominance specific processing of the perceptual difference according to another embodiment of the invention.

FIG. 5 is another alternative embodiment for the perceptual difference block described in FIG. 2. FIG. 5 is similar to FIG. 4, except that an uncertainty compensated perceptual difference processor may also be replaced with a LUT. This uncertainty compensated perceptual difference LUT produces two independent numbers for the a and b channels, one with inputs of {ua,ma,da}, and an mda output, and the other with inputs of {ub,mb,db}, along with an mdb output.

Figure 6:
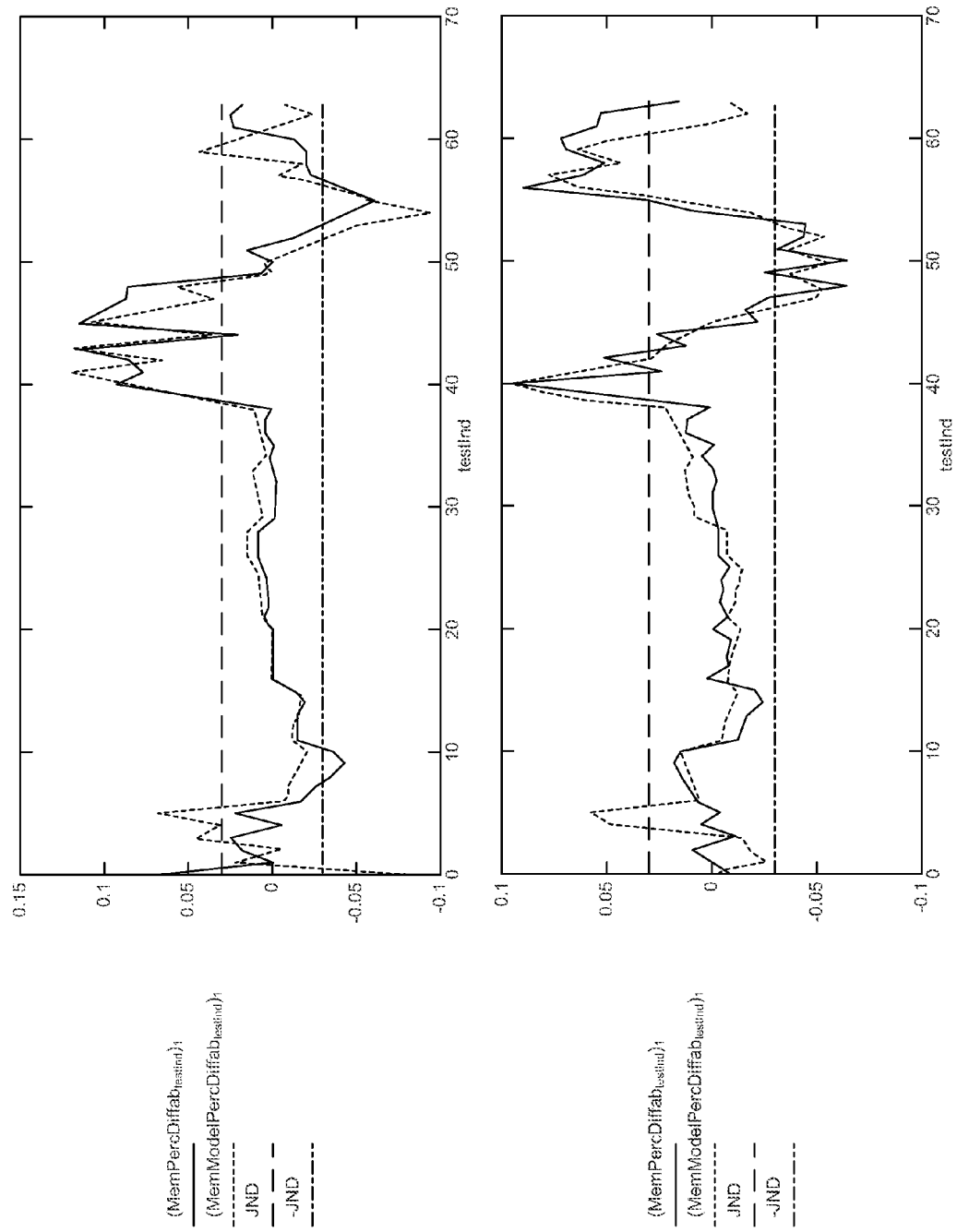
FIG. 6 is a set of plots showing the change in human memory color against changes predicted by the memory prediction from a processor according to embodiments of the invention.

FIG. 6 includes two plots of one dimension of a stimulus parameter showing the change in human memory color (matched with direct experiments) vs. changes predicted by the memory prediction from a processor according to embodiments of the present invention. Top plot shows ma-da response (solid line for human, dashed for model) while the bottom line shows likewise for mb-db. The independent x-axis is test number of various tests, while the y-axis is in units of CIEAM02. The two horizontal lines in each plot show approximately the positive and negative JND/threshold differences.

Figure 7:
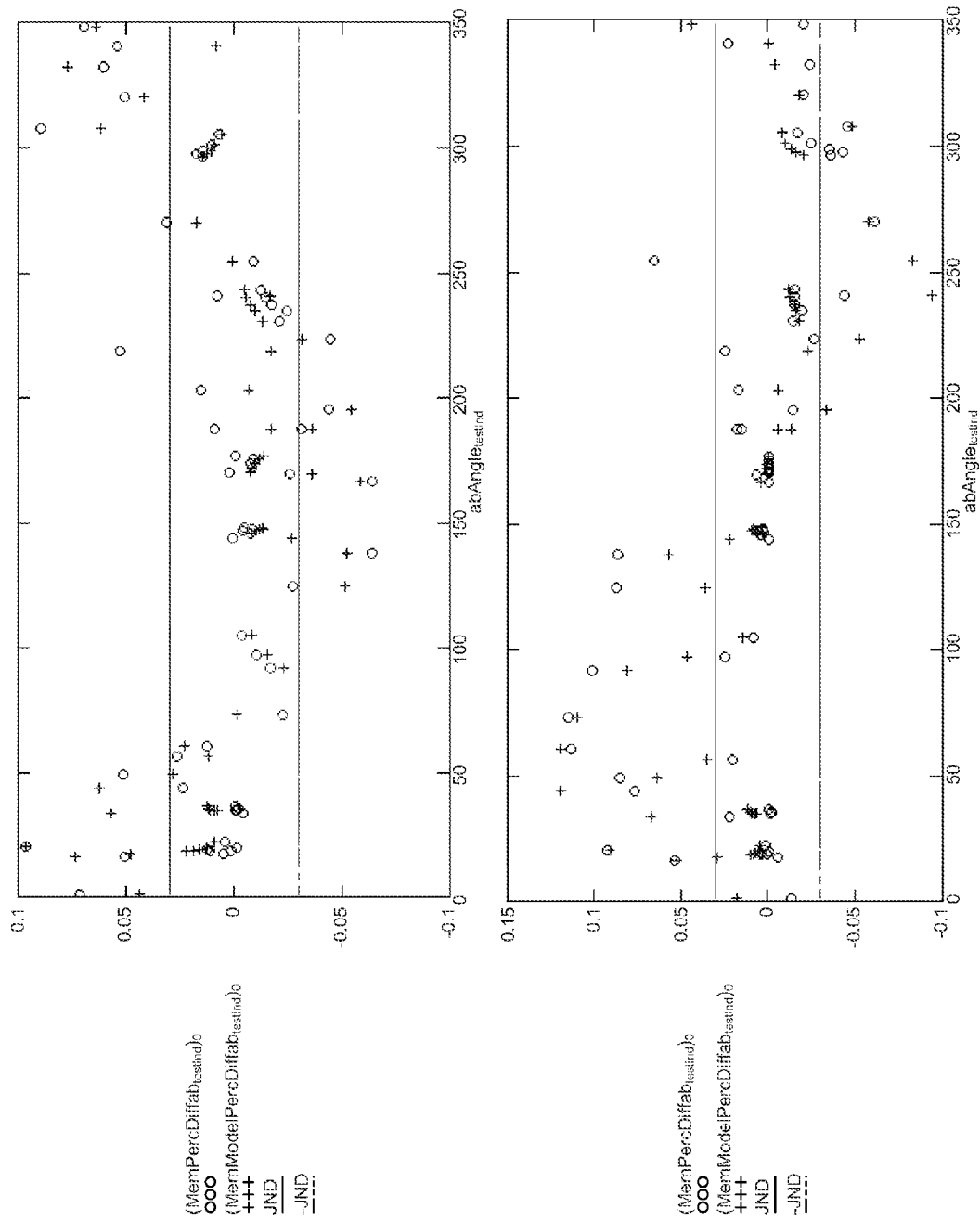
FIG. 7 is a set of plots showing the change in human memory color against changes predicted by the memory prediction from a processor according to embodiments of the invention.

FIG. 7 illustrates plots of the change in human memory color (matched with direct experiments) against changes predicted by the memory prediction from a processor according to embodiments of the present invention. These plots are similar to those of FIG. 6, except the independent axis is color angle. JNDs are likewise illustrated.

Figure 8:
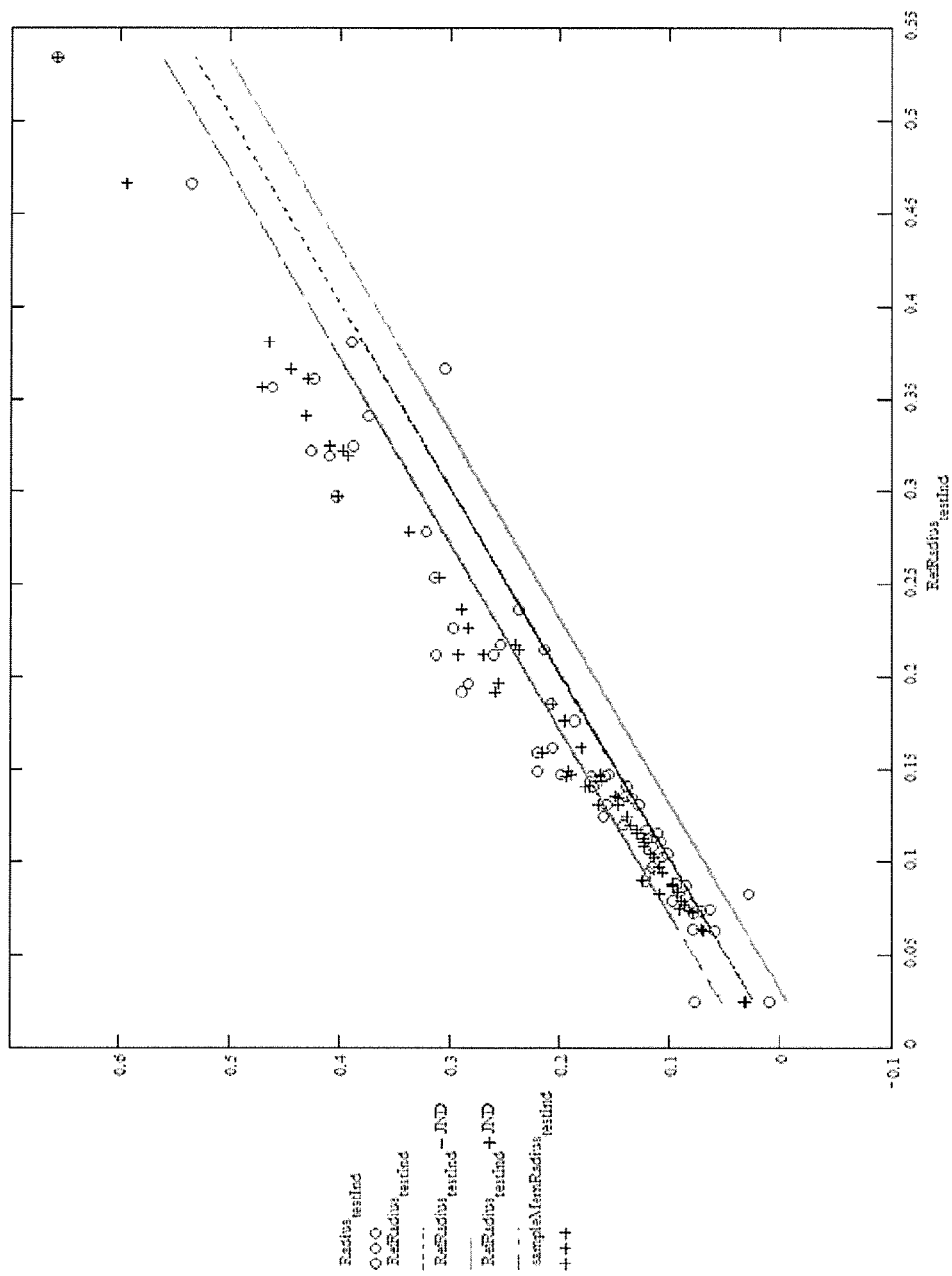
FIG. 8 is a plot showing the change in human memory color against changes predicted by the memory prediction from a processor according to embodiments of the invention.

FIG. 8 illustrates plots of the change in human memory color (matched with direct experiments) vs. changes predicted by the memory prediction of a processor according to embodiments of the present invention. The dependent axis represents the memory color radius in CIECAM02 a,b space (approximately corresponding to relative saturation) while the independent (horizontal) axis corresponds to the reference (direct viewed) color radius: o for human response, + for model response. The three diagonal lines, from top to bottom, show upper threshold limit, no change and lower threshold limits respectively.

Figure 9:
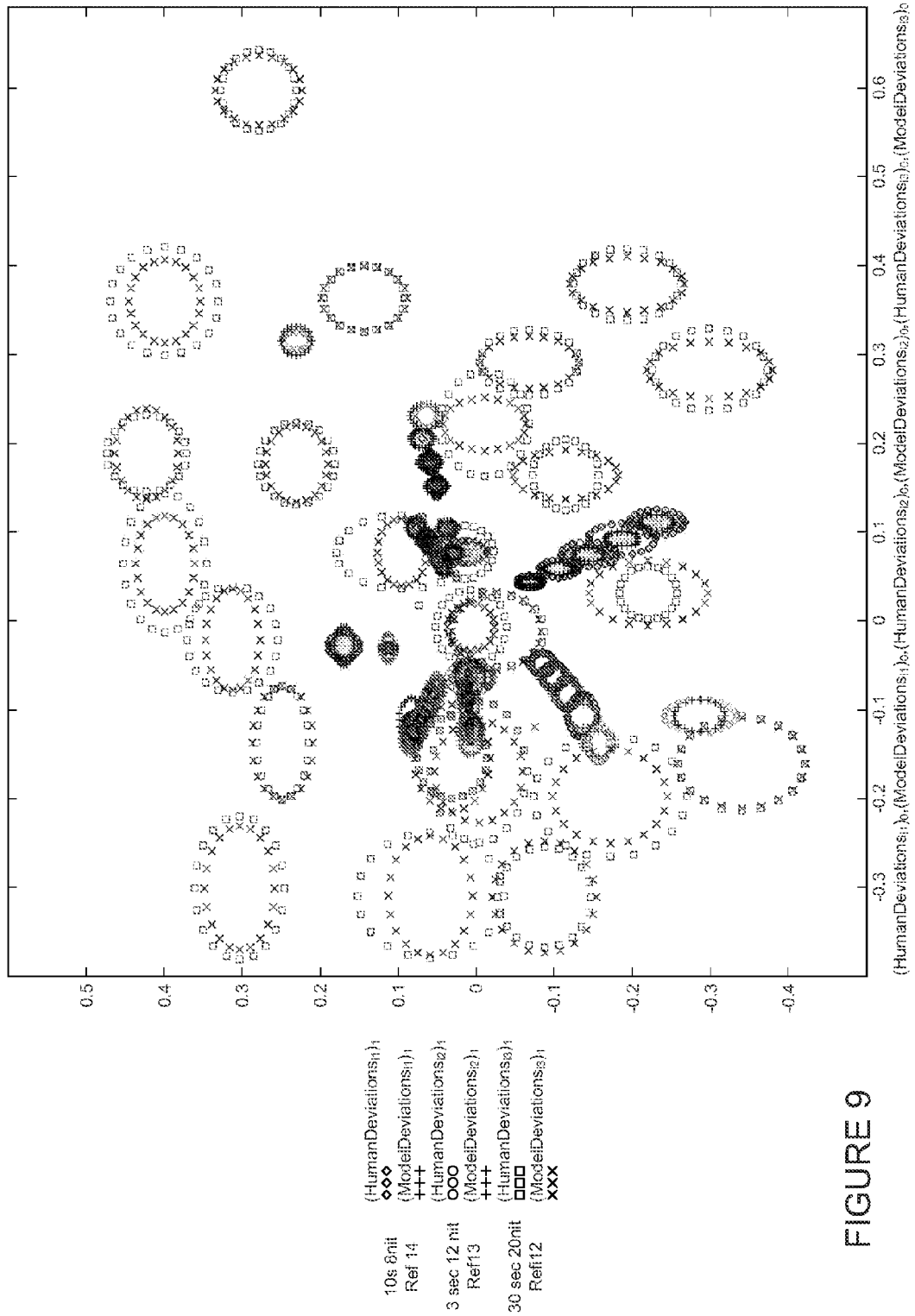
FIG. 9 illustrates plots of the increase in uncertainty of match between human memory color against an increase in uncertainty predicted by the memory prediction of a processor according to embodiments of the present invention.

FIG. 9 illustrates plots of the increase in uncertainty of match between human memory color (matched with direct experiments) vs. increase in uncertainty predicted by the memory prediction of a processor according to embodiments of the present invention. The independent (horizontal) axis is CIECAM02 a, and the dependent (vertical) axis is CIECAM02 b. Analogous to MacAdam ellipses, each ellipse represents the increase in threshold (in CIECAM02 a,b space instead of CIE 1931 xy space, etc.) of discrimination (just noticeable difference or JND) between colors recalled from memory and colors seen directly (ua, ub). The human response discrimination increase is represented by diamonds (10 second delay, 8 nits), o's (3 second delay, 12 nits) and squares (30 second delay, 20 nits). The predicted response discrimination increase according to embodiments of the invention is represented by light+(10 second delay, 8 nits), dark +'s (3 second delay, 12 nits) and dark x's (30 second delay, 20 nits). The largest departures are consistent with experimental data margin of error.

In various embodiments, components of the invention may be implemented in hardware, software, or a combination of the two, and may comprise a general purpose microprocessor, a digital signal processor (DSP), an application specific integrated circuit (ASIC), a field-programmable gate array (FPGA), or the like.

It will be appreciated from the forgoing discussion that the present invention represents a significant advance in the field of human vision modeling. Although specific embodiments of the invention have been illustrated and described for purposes if illustration, it will be understood that various modifications may be made without departing from the spirit and scope of the invention. Accordingly, the invention should not be limited except as by the appended claims.

What is claimed is:

1. A processor for predicting perceptual differences between colors recalled from memory and directly viewed colors in a tested video, comprising:
   an input for accepting a reference video and the tested video;
   a memory effects processor structured to generate a compensation factor for distortions of color due to memory effects and apply the compensation factor to data from the reference video or data from the tested video, in which the compensation factor comprises a factor to account for a change toward a cardinal color in memory over time;
   an output structured to deliver a set of perceptual difference measurements;
   a perceptual response generator structured to generate a perceptual response for the reference video and the tested video; and
   a categorization processor structured to apply a categorization process to the perceptual response for the reference video and to the perceptual response for the tested video, and in which the compensation factor is applied to the categorized responses.

2. The processor of claim 1 in which the compensation factor comprises a color saturation exaggeration factor.

3. The processor of claim 1 in which the compensation factor comprises a color angle change factor.

4. The processor of claim 1 in which the compensation factor comprises a uncertainty factor.

5. The processor of claim 1 in which a strength of the categorization process is controllable.

6. A system for predicting perceptual differences between a test and a reference video, comprising:
   an input for receiving the test and reference video;
   a display modeler for both the test and the reference video;
   a view modeler for both the test and the reference video;
   a perceptual modeler for both the test and the reference video that generates a perceptual response for the test video and a perceptual response for the reference video;
   a perceptual difference prediction calculator having inputs for the perceptual response for the test video and the perceptual response for the reference video, and including a memory effects processor structured to generate a compensation factor for distortions of color due to memory effects and apply the compensation factor to the perceptual response for the test video or the perceptual response for the reference video, in which the compensation factor comprises a factor to account for a change toward a cardinal color in memory over time; and
   a system output for providing data describing the predicted perceptual differences between the test and the reference video,
   in which the perceptual difference prediction calculator further comprises a categorization processor structured to apply a categorization process to the perceptual response for the test video and the perceptual response for the reference video, and in which the compensation factor is applied to the categorized responses.

7. The system of claim 6 in which the compensation factor comprises a color saturation exaggeration factor.

8. The system of claim 6 in which the compensation factor comprises a color angle change factor.

9. The system of claim 6 in which the compensation factor comprises a uncertainty factor.

10. A method in a processor for predicting perceptual differences between colors recalled from memory and directly viewed colors in a tested video, the method comprising:
    accepting a reference video and the tested video;
    generating a compensation factor in a color memory effects processor for distortions of color due to memory effects, in which generating a compensation factor in a color memory effects processor comprises generating a factor to account for a change toward a cardinal color in memory over time;
    applying the compensation factor to the data describing the reference video or to data describing the test video;
    generating a perceptual response for the reference video and the tested video;
    performing a categorization process to the perceptual response of the reference video and to the perceptual response of the tested video;
    outputting a set of perceptual difference measurements.

11. The method of claim 10, in which processor of claim 1 in which
    generating a compensation factor in a color memory effects processor comprises generating a color saturation exaggeration factor.

12. The method of claim 10, in which processor of claim 1 in which
   generating a compensation factor in a color memory effects processor comprises generating a color angle change factor.

13. The method of claim 10, in which processor of claim 1 in which
   generating a compensation factor in a color memory effects processor comprises generating an uncertainty factor.

* * * * *